United States Patent
LaPointe et al.

(10) Patent No.: US 9,845,772 B2
(45) Date of Patent: Dec. 19, 2017

(54) SYSTEM AND METHOD FOR MANAGING CONDENSATION IN EGR SYSTEMS

(71) Applicant: Cummins, Inc., Columbus, IN (US)

(72) Inventors: Leon A. LaPointe, Columbus, IN (US); Daniel J. Mohr, Scipio, IN (US); Edward J. Lyford-Pike, Columbus, IN (US); Ashish Gupta, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 79 days.

(21) Appl. No.: 14/700,353

(22) Filed: Apr. 30, 2015

(65) Prior Publication Data

US 2016/0319779 A1 Nov. 3, 2016

(51) Int. Cl.
*F02M 26/33* (2016.01)
*F02M 26/47* (2016.01)
(Continued)

(52) U.S. Cl.
CPC ............ *F02M 26/33* (2016.02); *F01N 3/021* (2013.01); *F01N 3/101* (2013.01);
(Continued)

(58) Field of Classification Search
CPC .............. F02D 41/0065; F02D 41/005; F02D 41/0052; F02D 41/0072; F02D 41/0077; F02D 41/0047; F02D 2041/0067; F02M 26/06; F02M 26/05; F02M 26/25; F02M 26/24; F02M 26/28; F02M 26/33;
(Continued)

(56) References Cited

U.S. PATENT DOCUMENTS 6,009,709 A 1/2000 Bailey
6,301,887 B1 10/2001 Gorel et al.
(Continued)

FOREIGN PATENT DOCUMENTS

EP 1 963 646 9/2008
GB 2 385 094 8/2006

OTHER PUBLICATIONS

First Office Action issued for U.S. Appl. No. 14/678,323, dated May 12, 2017, 17 pages.

*Primary Examiner* — Sizo Vilakazi
(74) *Attorney, Agent, or Firm* — Foley & Lardner LLP (57) ABSTRACT

A system and method for condensation management in a low-pressure loop EGR system are provided. The system includes an EGR condensation temperature module configured to determine an EGR condensation temperature of recirculated exhaust gas upstream of an EGR cooler and an EGR coolant temperature controller communicably coupled to the EGR condensation temperature module. The EGR coolant temperature controller provides EGR coolant to the EGR cooler at or above the EGR condensation temperature. The system also includes a charge air condensation temperature module configured to determine a charge air condensation temperature of charge air upstream of a charge air cooler and a charge air coolant temperature controller communicably coupled to the charge air condensation temperature module. The charge air coolant temperature controller provides charge air coolant to the charge air cooler at or above the charge air condensation temperature.

24 Claims, 3 Drawing Sheets

(51) Int. Cl.
*F01N 3/021* (2006.01)
*F01N 3/10* (2006.01)
*F02B 29/04* (2006.01)
*F02M 26/06* (2016.01)
*F02M 26/28* (2016.01)
*F02M 26/15* (2016.01)
*F02M 26/35* (2016.01)
*F02D 41/00* (2006.01)
*F02D 19/02* (2006.01)
*F02M 21/04* (2006.01)

(52) U.S. Cl.
CPC ...... *F02B 29/0443* (2013.01); *F02B 29/0493* (2013.01); *F02M 26/06* (2016.02); *F02M 26/15* (2016.02); *F02M 26/28* (2016.02); *F02M 26/35* (2016.02); *F02M 26/47* (2016.02); *F02D 19/02* (2013.01); *F02D 41/0065* (2013.01); *F02M 21/04* (2013.01); *Y02T 10/146* (2013.01); *Y02T 10/22* (2013.01)

(58) Field of Classification Search
CPC ..... F02M 26/47; Y02T 10/146; Y02T 10/144; F01N 3/021; F01N 3/101; F02B 29/0443; F02B 29/0493
USPC ........................................ 123/568.11–568.32
See application file for complete search history.

(56) References Cited

U.S. PATENT DOCUMENTS

| | | | |
|---|---|---|---|
| 6,367,256 | B1 | 4/2002 | McKee |
| 6,725,847 | B2 | 4/2004 | Brunemann et al. |
| 7,079,938 | B2 | 7/2006 | Bhargava et al. |
| 7,322,193 | B2 | 1/2008 | Bering et al. |
| 2007/0039322 | A1 | 2/2007 | Bering et al. |
| 2011/0000469 | A1 | 1/2011 | Lauberts et al. |
| 2011/0023796 | A1* | 2/2011 | Cattani ............... F01P 3/12 123/41.1 |
| 2011/0023842 | A1 | 2/2011 | Kurtz |
| 2011/0048389 | A1 | 3/2011 | Hsia et al. |
| 2012/0090584 | A1 | 4/2012 | Jung |
| 2014/0102428 | A1* | 4/2014 | Fulton ............... F02B 29/0468 123/568.12 |
| 2014/0245735 | A1* | 9/2014 | Kuske ............... F02B 29/0443 60/599 |
| 2014/0299112 | A1* | 10/2014 | Quix ............... F02B 33/34 123/559.1 |
| 2015/0047340 | A1* | 2/2015 | Ulrey ............... F02B 47/08 60/600 |
| 2016/0290288 | A1* | 10/2016 | LaPointe ............ F02B 29/0437 |
| 2016/0319779 | A1 | 11/2016 | LaPointe et al. |

* cited by examiner

SYSTEM AND METHOD FOR MANAGING CONDENSATION IN EGR SYSTEMS

TECHNICAL FIELD

This disclosure relates to exhaust gas recirculation system for an internal combustion engine.

BACKGROUND

Exhaust gas is recirculated in an internal combustion engine to improve NOx emissions from the engine. The recirculated exhaust gas is mixed with the intake air and fuel. Mixing the recirculating the exhaust gas with the intake air dilutes the air by lowering the oxygen concentration and reduces the peak combustion temperature experienced in the combustion chamber of the internal combustion engine. While the recirculated exhaust gas reduces the NOx emissions it can reduce fuel efficiency and increase particulate matter emissions, hydrocarbon emissions, carbon monoxide emissions, and wear on various components of the engine.

EGR systems may be provided upstream of a turbine and a compressor of an internal combustion engine, in a format generally referred to as a high pressure loop EGR system in view of the higher pressures that the exhaust gas is at pre-turbine. EGR systems may also be provided downstream of a turbine and compressor of an internal combustion engine, in a format generally referred to as a low pressure loop EGR system in view of the lower pressures that the exhaust gas is at post-turbine with respect to the pressure of the exhaust gas pre-turbine in the high pressure loop EGR system. While low pressure loop EGR systems generally have better brake thermal efficiency (BTE) than high pressure loop systems, low pressure loop EGR systems also have greater susceptibility to condensation generation, which condensation or liquid water in the system is highly detrimental to performance and life of the turbocharger or supercharger compressor.

SUMMARY

Various embodiments disclosed herein provide systems and methods of controlling condensation in a low-pressure loop exhaust gas recirculation system.

Particular embodiments provide a low-pressure loop exhaust gas recirculation (EGR) condensation management system including an EGR condensation temperature module configured to determine an EGR condensation temperature of recirculated exhaust gas upstream of an EGR cooler in the low-pressure loop exhaust gas recirculation system. The system includes an EGR coolant temperature controller communicably coupled to the EGR condensation temperature module. The EGR coolant temperature controller is configured to provide EGR coolant to the EGR cooler at or above the EGR condensation temperature. The system also includes a charge air condensation temperature module configured to determine a charge air condensation temperature of charge air upstream of a charge air cooler in the low-pressure loop exhaust gas recirculation system. The system includes a charge air coolant temperature controller communicably coupled to the charge air condensation temperature module. The charge air coolant temperature controller is configured to provide charge air coolant to the charge air cooler at or above the charge air condensation temperature.

Particular embodiments provide a computerized method of controlling condensation in a low-pressure loop exhaust gas recirculation system. The method includes receiving an EGR condensation temperature factor from at least one first sensor, determining an EGR condensation temperature of recirculated exhaust gas upstream of an EGR cooler in the low pressure loop exhaust gas recirculation system based on the EGR condensation temperature factor, providing an EGR coolant to the EGR cooler at or above the EGR condensation temperature, receiving a charge air condensation temperature factor from at least one second sensor, determining a charge air condensation temperature of charge air upstream of a charge air cooler in the low-pressure loop exhaust gas recirculation system based on the charge air condensation temperature factors, and providing a charge air coolant to the charge air cooler at or above the charge air condensation temperature.

Particular embodiments also provide an internal combustion engine system including an internal combustion engine including a turbine fluidly coupled to an exhaust manifold of the internal combustion engine and a compressor fluidly coupled to an intake manifold of the internal combustion engine. The engine system also includes a low-pressure loop exhaust gas recirculation fluidly coupled to the turbine and the compressor. The low-pressure loop exhaust gas recirculation system is positioned downstream of the turbine so as to receive exhaust gas from the internal combustion engine downstream of the turbine. The low-pressure loop exhaust gas recirculation system includes an EGR cooler. The EGR cooler is positioned upstream of the compressor. The engine system also includes a charge air cooler positioned downstream of the compressor and upstream of the intake manifold. The engine system includes at least one first sensor coupled to the low-pressure loop exhaust gas recirculation system. The at least one first sensor is configured to determine an EGR condensation temperature factor of recirculated exhaust gas upstream of the EGR cooler. The engine system includes at least one second sensor configured to determine a charge air condensation temperature factor of charge air upstream of the charge air cooler. The engine system also includes an EGR condensation temperature module in the low-pressure loop exhaust gas recirculation system, the EGR condensation temperature module configured to determine an EGR condensation temperature based on the EGR condensation factor. The engine system includes an EGR coolant temperature controller communicably coupled to the at least one first sensor, the EGR coolant temperature controller configured to provide EGR coolant to the EGR cooler at or above the EGR condensation temperature. The engine system includes a charge air condensation temperature module in the low-pressure loop exhaust gas recirculation system. The charge air condensation temperature module is configured to determine a charge air condensation temperature based on the charge air condensation factor. The engine system includes a charge air coolant temperature controller communicably coupled to the at least one second sensor. The charge air coolant temperature controller is configured to provide charge air coolant to the charge air cooler at or above the charge air condensation temperature.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, and methods of controlling EGR gas temperature to avoid condensation. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
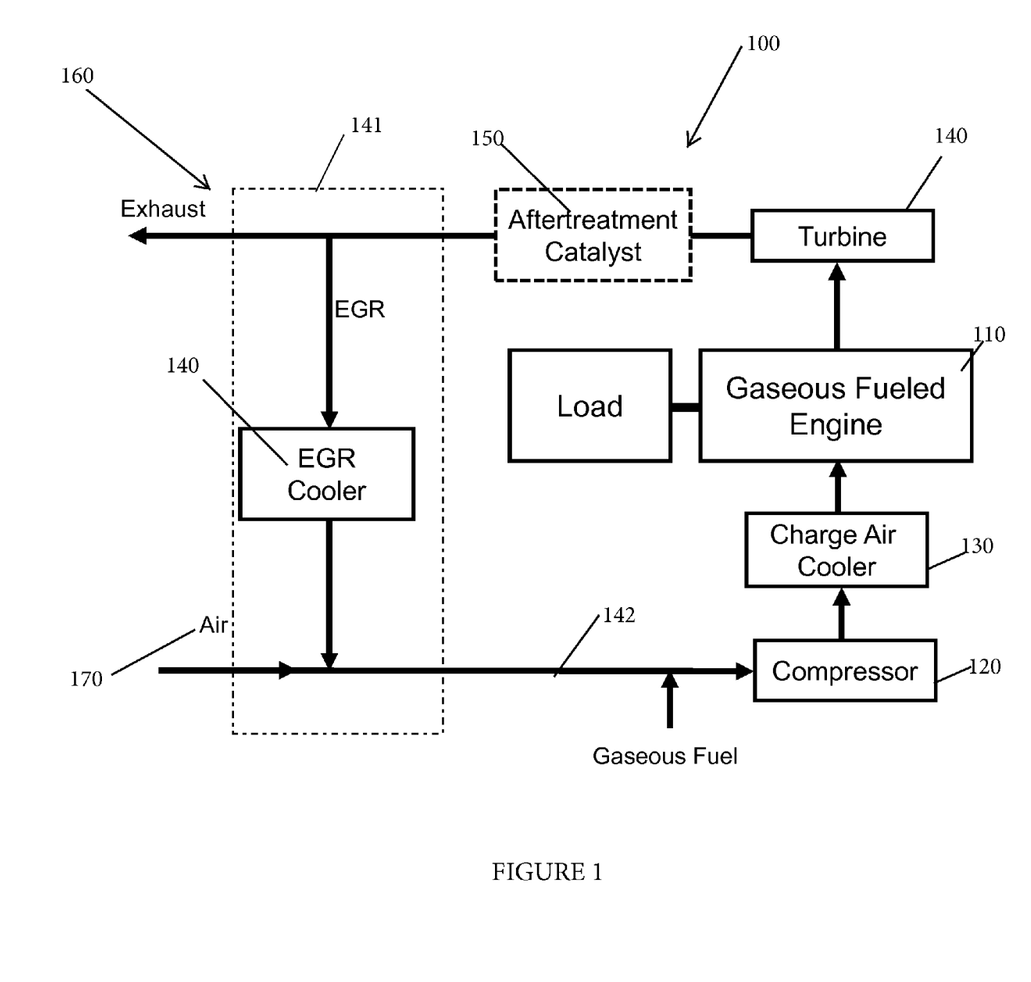
FIG. 1 is a block diagram of an engine system including a low-pressure loop EGR system, in accordance with example embodiments.

FIG. 1 is block diagram of an engine system including a low-pressure loop EGR system, in accordance with example embodiments. According to the embodiment of an internal combustion engine system 100 shown in FIG. 1, the internal combustion engine system 100 includes an internal combustion engine 110. The engine 110 is a spark-ignited engine fueled by gaseous hydrocarbons, such as natural gas, petroleum gas (propane), and hydrogen. Gaseous fuels such as natural gas may be stored as a cryogenic liquid that is vaporized and suitably controlled for usage by the engine upon introduction into the internal combustion engine 110. As defined herein, gaseous fuels, as opposed to non-gaseous fuels (e.g., gasoline and diesel), are those that are introduced and managed within the engine in a gaseous state, as opposed to, a liquid or solid state. In the illustrated implementations, the engine 110 is a spark-ignited engine fueled by natural gas. However embodiments disclosed herein are not limited to gaseous fueled spark ignited internal combustions engines, but may include non-gaseous fueled engines including gasoline and diesel fueled engines.

The internal combustion engine system 100 includes a compressor 120 and a charge air cooler 130 on the intake side (e.g. upstream of an intake manifold of the engine) and a turbine 140 downstream of the internal combustion engine 110 on the exhaust side (e.g. downstream of an exhaust manifold of the engine). The internal combustion engine system 100 also includes a low-pressure loop EGR system 141 downstream of the turbine 140 and upstream of the compressor 120. The low-pressure loop EGR system 141 includes an EGR cooler 140. The internal combustion engine system 100 also optionally includes an exhaust aftertreatment catalyst 150, such as a three-way catalyst on the exhaust side of the internal combustion engine 110. The low-pressure loop EGR system 141 may also include an EGR air mixer, which may be configured to mix EGR gas and ambient intake air received via air intake 170 for mixing with fuel injected via fuel injection system 180. The intake air may be received from the air intake system 170 including an air inlet that receives air at atmospheric pressure. The combined fuel, ambient intake air, and EGR generally constitute the charge air compressed by compressor 120 before entering the internal combustion engine 110 and cooled by the charger air cooler 130. In example embodiments, fuel may be mixed with the ambient air prior to mixing the air with the EGR. In other example embodiments, fuel may be directly injected into the combustion chambers of internal combustion engine 110 via fuel injectors. Generally, the fuel is supplied from a fuel tank and pumped through a fuel delivery system via a fuel pump prior to being injected into the system. With or without injected fuel, the air/EGR mixture is compressed by the compressor 120 to increase the pressure and density of the mixture. The compressor 120 may co-rotatably driven by the turbine 140, which is driven by the exhaust gas flow from the engine 110. The compressed air/EGR mixture enters the charge air cooler 130, post compression. The charger air cooler 130 decreases the temperature of the charge air for sustaining the use of a denser intake charge into the internal combustion engine 110. Following cooling, the air/EGR mixture is directed into the combustion chambers of the internal combustion engine 110. Whether the fuel is injected directly into the combustion chambers or injected into the air/EGR mixture upstream of the engine, the combined fuel and air/EGR mixture is ignited via a spark-ignition in internal combustion engine 110 for combustion whereby the increased pressure from the combustion powers the engine.

Combustion of the fuel produces exhaust gas that is operatively vented to the exhaust 160 system after driving the turbine 140 of a turbocharger. The exhaust system 160 may include one or more exhaust treatment components, such as, for example, an exhaust catalyst, which may be a three-way catalysts, oxidation catalysts, filters, adsorbers, and the like, for treating (i.e., removing pollutants from) the exhaust gas. As demonstrated herein, in example embodiments, the exhaust system may include a methane oxidation catalyst. As defined herein, a methane oxidation catalyst is any exhaust aftertreatment catalyst that is capable of oxidizing methane in the received exhaust gas. As will be described herein, the methane oxidation catalyst can be a stand-alone flow-through catalyst or form part of a three-way flow-through catalyst.

The three-way flow-through catalyst may include a catalyst bed exposed to the exhaust gas flowing through the exhaust system 160 and past the bed. The catalyst bed includes a catalytic layer disposed on a washcoat or carrier layer. The carrier layer can include any of various materials (e.g., oxides) capable of suspending the catalytic layer therein. The catalyst layer is made from one or more catalytic materials selected to react with (e.g., oxidize) one or more pollutants in the exhaust gas. The catalytic materials of the three-way catalyst may include any of various materials, such as precious metals platinum, palladium, and rhodium, as well as other materials, such as transition metals cerium, iron, manganese, and nickel. Further, the catalyst materials can have any of various ratios relative to each other for oxidizing and reducing relative amounts and types of pollutants as desired. Generally, the three-way catalyst is so termed because it contains catalytic materials specifically selected to react with and oxidize or reduce three specific pollutants. The three specific pollutants include carbon monoxide (CO), unburned hydrocarbons (UHC), and nitrogen oxides (NOx). Unlike conventional three-way catalysts, the three-way catalyst includes catalytic materials specifically configured to oxidize the UHC methane. In some implementations, any of various catalytic material formulations can be used to oxidize methane. In one particular implementation, methane is oxidized in the presence of at least one catalytic material that is high in precious metal content, such as palladium, platinum, and rhodium. Although the three-way catalyst is depicted as a single unit in FIG. 1, in some embodiments, the three-way catalyst can be formed of two or more separate, disparate units. For example, in one embodiment, the three-way catalyst is housed within a single housing, while in another embodiment, the three-way catalyst includes three separate catalysts (e.g., a CO oxidation catalyst, a methane oxidation catalyst, and a NOx reduction catalyst) each housed within a separate housing. Although not shown, the exhaust system 160 may include other exhaust treatment devices, such as filters, that further treat the exhaust gas before it vents into the atmosphere. Additionally, in some implementations where the three-way catalyst is housed within the same housing, the catalyst includes three catalyst beds positioned adjacent each other to form three separate catalyst stages. According to one implementation, the methane oxidation stage is upstream of the NOx reduction stage such that the amount of excess oxygen in the exhaust gas is first reduced via methane oxidation before NOx is reduced by the NOx reduction stage. In this manner, excess oxygen in the exhaust gas generated by the engine due to operation under lean stoichiometric conditions does not negatively affect the ability of the NOx reduction catalyst to reduce NOx. The exhaust system 160 may also include one or more exhaust flow regulation devices configured generally to regulate the flow rate and backpressure of exhaust gas within the main exhaust line. Additionally, the exhaust system may include exhaust flow regulation devices to regulate the exhaust gas flow rate and pressure (e.g., backpressure) of exhaust gas flowing into, through, and out of the exhaust system 160. The exhaust system may include actuators and valves to direct exhaust gas to one or more destinations. For example, the exhaust system 160 may include an EGR valve that is actuatable to direct (e.g., vent) a portion of the received exhaust gas into the atmosphere as expelled exhaust and direct a portion of the received exhaust gas into the low pressure loop EGR system 141 for recirculation back into the combustion chambers.

Figure 2:
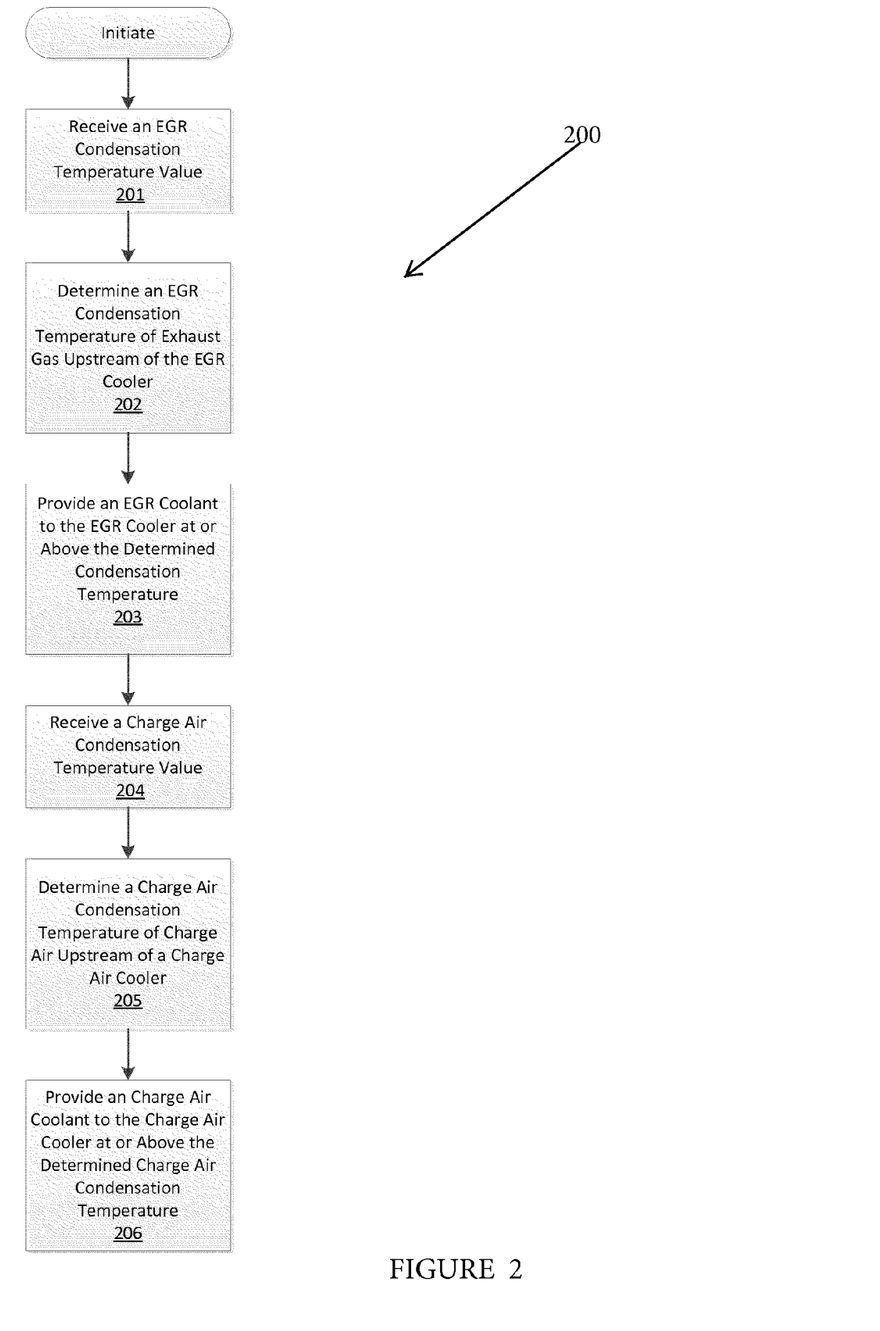
FIG. 2 is a flow chart for implementing a low-pressure loop exhaust gas recirculation (EGR) condensation management system, in accordance with example embodiments.

FIG. 2 is a flow chart for implementing a low-pressure loop exhaust gas recirculation (EGR) condensation management system, in accordance with example embodiments. An EGR condensation management system 200 for controlling condensation in a low-pressure loop EGR system receives an EGR condensation temperature factor at 201. The EGR condensation temperature factor may be provided by at least one first sensor, flow controller, heat rejecter or other component providing a factor descriptive of and corresponding to a property of an recirculated exhaust flow upstream of an EGR cooler. In example embodiments, the at least one first sensor is positioned upstream of the EGR cooler. The factor may include an EGR fraction, fuel composition, ambient pressure, ambient temperature, and ambient humidity. A processor uses the one or more factors received at 201 to determine an EGR condensation temperature for recirculated exhaust gas upstream of the EGR cooler at 202. The EGR condensation temperature generally corresponds to the dew point of the EGR. At 203, a control module causes coolant to be provided to the EGR cooler at or above the determined EGR condensation temperature to cool the EGR gas entering the EGR cooler to a temperature determined to help avoid condensation of the exhaust gas in the EGR cooler. At 204 the EGR condensation management system 200 receives a charge air condensation temperature factor. The charge air condensation factor may be provided by at least one second sensor, flow controller, a heat rejecter or other component providing a factor descriptive of and corresponding to a property of charge air upstream of the charge air cooler. The at least one second sensor may include one or more of a temperature sensor, a pressure sensor, a humidity sensor, a flow control sensor, a fuel controller or other component configured to provide a factor associated with the charge air upstream of the charge air cooler. A processor uses the one or more factor received at 204 to determine a charge air condensation temperature for charge air upstream of a charge air cooler at 205. The charge air condensation temperature generally corresponds to the dew point of the charge air. At 206 a control module causes charge air coolant to be provided to the charge air cooler at or above the determined charge air condensation temperature.

An EGR condensation management system 200 for controlling condensation in a low-pressure loop EGR system further includes a controller structured to perform certain operations to determine condensation temperatures and provide coolants at or above those condensation temperatures. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes a sensor module configured to determine condensation temperatures from one or more sensed condensation temperature factors. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 2.

Example and non-limiting module implementation elements include sensors providing any factor or value determined herein, sensors providing any factor or value that is a precursor to a factor or value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 3:
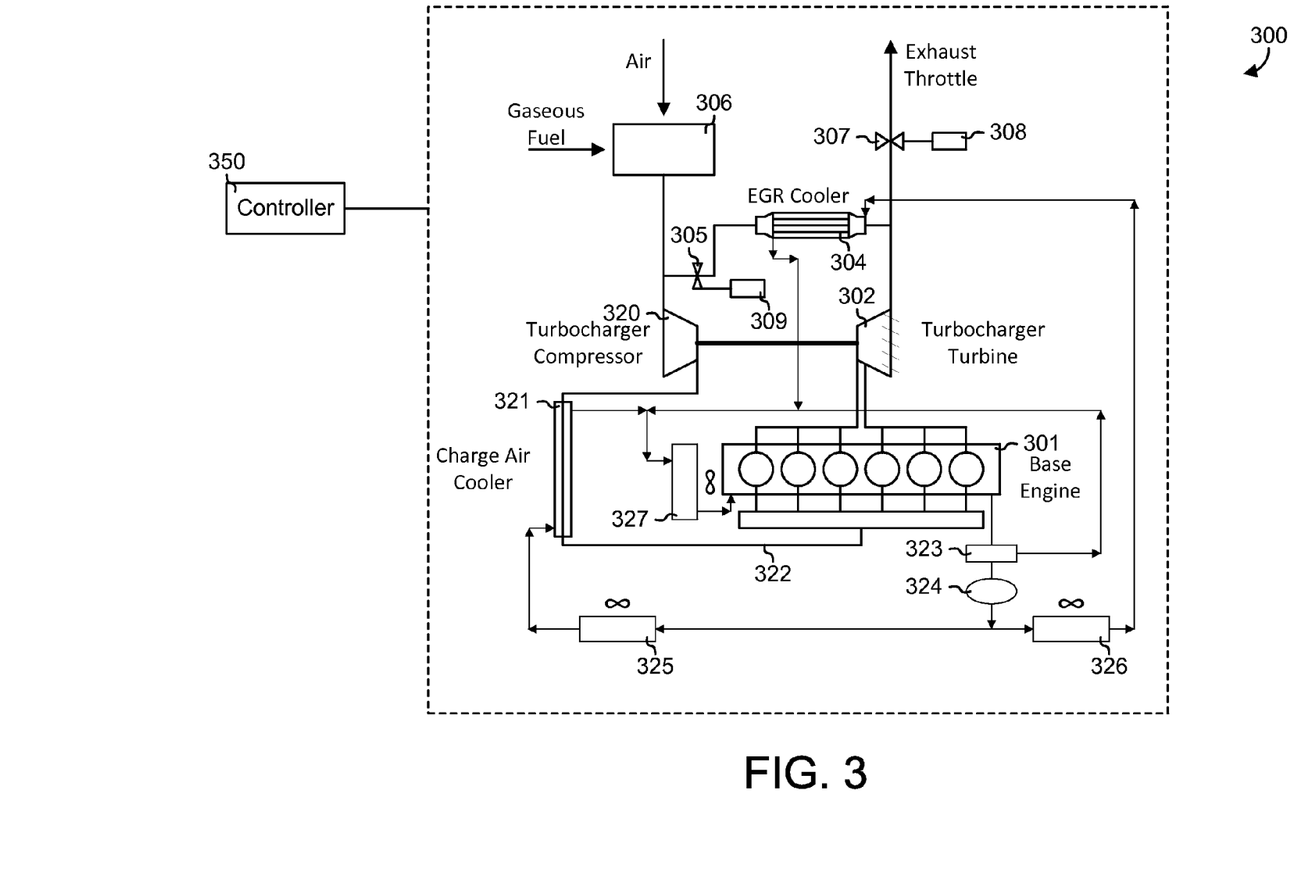
FIG. 3 is schematic of an engine system including a low-pressure loop EGR system, in accordance with example embodiments.

FIG. 3 is schematic of an engine system including a low-pressure loop EGR system, in accordance with example embodiments. According to one embodiment and as shown, the engine system 300 is structured to provide coolant to the EGR cooler 304 at or above an EGR condensation temperature of the coolant. The engine system 300 is also structured to provide coolant to the charge air cooler 321 at or above the charge air condensation temperature. In this regard, the engine system 300 illustrates one example embodiment for implementing method 200. It should be understood that various replacements, modifications, and configurations may also be utilized to implement method 200, such that system 300 is not meant to be limiting. Furthermore, as shown, a controller 350 (such as the controller described above) is communicably and operably coupled to the engine system 300. The controller 350 is structured to receive data from one or more components in the system 300 (e.g., EGR flow rate data, EGR temperature data, oxygen in the air intake, etc.) to facilitate control over one or more components in the engine system 300. More particularly and in the embodiment depicted, responsive to the data received, the controller 350 is structured to control various components of the system 300 to achieve or substantially achieve a temperature of coolant entering the charge air cooler 321 to be at or above a charge air condensation temperature and to achieve or substantially achieve a temperature of coolant entering the EGR cooler 304 to be at or above an EGR condensation temperature.

As shown, the engine system 300 includes an internal combustion engine 301. A turbine 302, including, but not limited to a variable geometry turbine, is coupled to the exhaust manifold 303 of the internal combustion engine 301. A low-pressure loop EGR system is positioned downstream of the turbine 302, in the illustrated embodiment.

The EGR system includes an EGR cooler 304 and is configured to fraction the exhaust gas via EGR control valve 305 controlled by EGR controller 309 and an exhaust throttle 307 configured to control the amount of exhaust gas removed from the EGR system via exhaust throttle controller 308. The engine system 300 includes a mixer 306 for mixing gaseous fuel and intake air. The mixed gaseous fuel and intake air are combined with cooled recirculated exhaust gas from EGR cooler 304. The amount of recirculated exhaust gas mixed with the gaseous fuel and intake air is governed by EGR control valve 305.

The combined gaseous fuel, air recirculated exhaust gas mixture are transferred to turbocharger 320. The turbocharger 320 compresses the charge air to increase the performance and/or efficiency of the internal combustion engine 301. Compressing the charge air increases the temperature of the charge air. Accordingly, the charge air is cooled via charge air cooler 321 before being introduced into the intake manifold 322 of the internal combustion engine 301.

To achieve or substantially achieve processes 203 and 206 of method 200, the engine system 300 is also shown to include a proportioning valve 323, an auxiliary pump 324, an auxiliary charge air cooler 325, an auxiliary EGR cooler 326, and an engine radiator and fan assembly 327. The engine radiator and fan assembly 327 may be configured as any type of radiator and fan assemblies used in engine systems.

The proportioning valve 323 is fluidly coupled to a coolant outlet from the engine 301 such that the proportioning valve 323 receives heated coolant from the engine 301. The valve 323 may be structured as any type of valve and is structured to selectively provide the heated coolant back to the charge air cooler 321 or to the auxiliary pump 324. The auxiliary pump 324 may be any type of pump or fluid moving device and, as shown, is downstream and fluidly coupled to the valve 323. The pump 324 directs coolant to the auxiliary charge air cooler 325 and the auxiliary EGR cooler 326. In another embodiment, a valve may be positioned downstream from the pump 324, such that the controller 350 may selectively control where and the quantity of coolant that the pump 324 pumps (e.g., to only the auxiliary EGR cooler 326, to only the auxiliary charge air cooler 325, or to both the charge air cooler 325 and EGR cooler 326). The auxiliary charge air cooler 325 may be structured as any type of heat exchanger (with or without a fan) that facilitates the heat exchange between the coolant from the pump 324 and any other heat exchanging medium (e.g., air, the charge air (e.g., if serially aligned with the charge air cooler 321) or a portion thereof, another fluid, etc.) before transmitting the coolant to the charge air cooler 321. Similarly, the EGR cooler 326 may be structured as any type of heat exchanger (with or without a fan) that facilitates the heat exchange between the coolant from the pump 324 and another heat exchanging medium (e.g., air, exhaust gas or a portion thereof, another fluid, etc.) before transmitting the coolant to the EGR cooler 304.

Because the controller 350 is communicably coupled to the proportioning valve 323 and pump 324, the controller 350 can control the amount, direction, and flow rate of the coolant to at least one of the charge air cooler 325 and the EGR cooler 326. If the coolant temperature is already above the EGR condensation temperature, the controller 350 may instruct the valve 323 to direct all or mostly all the coolant directly to the EGR cooler 304 (e.g., no additional heat exchange needed). However, if the coolant is not above the EGR condensation temperature, the controller 350 may open the valve to direct the coolant to the EGR cooler 326 to absorb heat from the heat exchanging medium (e.g., exhaust gas) in the EGR cooler 326 to ensure or substantially ensure that the coolant temperature is at or above the EGR condensation temperature when the coolant is provided to the EGR cooler 304. If the coolant temperature is at or above the charge air condensation temperature, the controller 350 may route the coolant directly back to the charge air cooler 321 and bypass the auxiliary charge air cooler 325 (e.g., via another fluid passage (not shown) through control of the valve 323). If the coolant temperature is below the charge air condensation temperature, the controller 350 may route the coolant to the auxiliary charge cooler 325 to absorb heat to ensure or substantially ensure the coolant provided to the charge air cooler 321 is at or above the charge air condensation temperature.

In sum, condensation of the charge air or EGR may have adverse effects. Such adverse effects may include, but are not limited to, a concentration of dissolved acids (carbonic, sulfuric, nitric) in the condensate which can cause considerable corrosion on air handling components (EGR cooler, throttle valve, turbocharger compressor cover and impeller, etc.); condensation droplets impacting the turbocharger compressor impeller can cause rapid erosion and blade wear which severely reduces compressor performance; condensate can negatively impact performance of temperature and pressure sensors resulting in erroneous readings and poor control system performance; and the like. Beneficially, the systems, methods, and apparatuses provided herein substantially facilitate the management of said potential condensation. Advantageously, this condensation management may function to increase the efficiency of the engine system 300 and reduce the likelihood of at least some of the aforementioned adverse effects.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, factors or values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "having," "involving," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A low pressure loop exhaust gas recirculation (EGR) condensation management system comprising:
an EGR condensation temperature module configured to determine an EGR condensation temperature of recirculated exhaust gas upstream of an EGR cooler in the low pressure loop exhaust gas recirculation system;
an EGR coolant temperature controller communicably coupled to the EGR condensation temperature module, the EGR coolant temperature controller configured to provide EGR coolant to the EGR cooler at or above the EGR condensation temperature;
a charge air condensation temperature module configured to determine a charge air condensation temperature of charge air upstream of a charge air cooler in the low pressure loop exhaust gas recirculation system; and
a charge air coolant temperature controller communicably coupled to the charge air condensation temperature module, the charge air coolant temperature controller configured to provide charge air coolant to the charge air cooler at or above the charge air condensation temperature.

2. The system of claim 1, wherein the EGR coolant temperature controller is configured to provide EGR coolant to the EGR cooler at an EGR coolant temperature configured to cool EGR gas to an EGR temperature above the EGR condensation temperature.

3. The system of claim 1, wherein the charge air coolant temperature controller is configured to provide charge air coolant to the charge air cooler at a charge air coolant temperature configured to cool charge air to a charge air temperature above the charge air condensation temperature.

4. The system of claim 1, further comprising at least one first sensor communicably coupled to the EGR condensation temperature module, the at least one first sensor configured to detect an EGR condensation temperature factor, the EGR condensation temperature module configured to determine the EGR condensation temperature of the recirculated exhaust gas upstream of the EGR cooler based on the EGR condensation temperature factor.

5. The system of claim 4, wherein the at least one first sensor includes one of a temperature sensor, a pressure sensor, a humidity sensor, and a chemical sensor.

6. The system of claim 1, further comprising at least one second sensor communicably coupled to the charge air condensation temperature module, the at least one second sensor configured to determine a charge air condensation factor of charge air upstream of the charge air cooler.

7. The system of claim 1, further comprising an EGR flow controller configured to maintain EGR coolant flow through the EGR cooler at a constant flow rate.

8. The system of claim 1, further comprising an auxiliary heat controller configured to control an auxiliary heater to heat the EGR cooler.

9. A computerized method of controlling condensation in a low pressure loop exhaust gas recirculation system, the method comprising:
receiving an EGR condensation temperature factor from at least one first sensor;
determining an EGR condensation temperature of recirculated exhaust gas upstream of an EGR cooler in the low pressure loop exhaust gas recirculation system based on the EGR condensation temperature factor;
providing an EGR coolant to the EGR cooler at or above the EGR condensation temperature;
receiving a charge air condensation temperature factor from at least one second sensor;
determining a charge air condensation temperature of charge air upstream of a charge air cooler in the low pressure loop exhaust gas recirculation system based on the charge air condensation temperature factor; and
providing a charge air coolant to the charge air cooler at or above the charge air condensation temperature.

10. The method according to claim 9 further comprising:
determining an EGR coolant temperature configured to cool the EGR to the EGR condensation temperature; and
providing the EGR coolant to the EGR cooler at or above the EGR coolant temperature configured to cool the EGR to the EGR condensation temperature.

11. The method according to claim 10, wherein determining the EGR coolant condensation temperature includes determining one or more of an EGR fraction, a fuel composition, an ambient pressure, and ambient temperature, an ambient humidity, and an absolute pressure.

12. The method according to claim 11, further comprising determining a change in the fuel composition.

13. The method according to claim 9 further comprising:
determining a charge air coolant temperature configured to cool the charge air to the charge air condensation temperature; and
providing the charge air coolant to the charge air cooler at or above the charge air coolant temperature configured to cool the EGR to the EGR condensation temperature.

14. The method according to claim 9 further comprising maintaining EGR coolant flow through the EGR cooler at a constant flow rate.

15. The method according to claim 9 further comprising heating the EGR cooler, via an auxiliary heater.

16. The method according to claim 9 further comprising collecting condensate in the EGR upstream of the compressor.

17. An internal combustion engine system comprising:
an internal combustion engine including a turbine fluidly coupled to an exhaust manifold of the internal combustion engine and a compressor fluidly coupled to an intake manifold of the internal combustion engine;
a low pressure loop exhaust gas recirculation system fluidly coupled to the turbine and the compressor, the low pressure loop exhaust gas recirculation system positioned downstream of the turbine so as to receive exhaust gas from the internal combustion engine downstream of the turbine, the low pressure loop exhaust gas recirculation system including an EGR cooler, the EGR cooler positioned upstream of the compressor;
a charge air cooler positioned downstream of the compressor and upstream of the intake manifold;
at least one first sensor coupled to the low pressure loop exhaust gas recirculation system, the at least one first sensor configured to determine an EGR condensation temperature factor of recirculated exhaust gas upstream of the EGR cooler;

at least one second sensor configured to determine a charge air condensation temperature factor of charge air upstream of the charge air cooler;

an EGR condensation temperature module in the low pressure loop exhaust gas recirculation system, the EGR condensation temperature module configured to determine an EGR condensation temperature based on the EGR condensation factor;

an EGR coolant temperature controller communicably coupled to the at least one first sensor, the EGR coolant temperature controller configured to provide EGR coolant to the EGR cooler at or above an EGR condensation temperature;

a charge air condensation temperature module in the low pressure loop exhaust gas recirculation system, the charge air condensation temperature module configured to determine a charge air condensation temperature based on the charge air condensation factor; and a charge air coolant temperature controller communicably coupled to the at least one second sensor, the charge air coolant temperature controller configured to provide charge air coolant to the charge air cooler at or above the charge air condensation temperature.

18. The internal combustion engine system according to claim 17, further comprising a diesel particulate filter, the low pressure loop exhaust gas recirculation system positioned downstream of the diesel particulate filter.

19. The internal combustion engine system according to claim 17, wherein the EGR coolant temperature controller is configured to provide the EGR coolant to the EGR cooler at or above an EGR coolant temperature determined to cool the EGR to the EGR condensation temperature.

20. The internal combustion engine system according to claim 17, wherein the charge air coolant temperature controller is configured to provide the charge air coolant to the charge air cooler at or above a charge air coolant temperature determined to cool the charge air to the charge air condensation temperature.

21. The internal combustion engine system according to claim 17, wherein the low-pressure loop EGR includes a three way catalyst.

22. The internal combustion engine system according to claim 17, wherein the low-pressure loop EGR includes a water collector.

23. The internal combustion engine system according to claim 17, further comprising an EGR flow controller configured to maintain EGR coolant flow through the EGR cooler at a constant flow rate.

24. The internal combustion engine system according to claim 17, wherein the low pressure loop EGR includes insulation wrapped about the EGR cooler and the charge air cooler.

* * * * *

UNITED STATES PATENT AND TRADEMARK OFFICE
CERTIFICATE OF CORRECTION

PATENT NO. : 9,845,772 B2  
APPLICATION NO. : 14/700353  
DATED : December 19, 2017  
INVENTOR(S) : Leon A. LaPointe et al.

Page 1 of 1

It is certified that error appears in the above-identified patent and that said Letters Patent is hereby corrected as shown below:

In the Specification

Column 1, just before the TECHNICAL FIELD section, please add the following heading and paragraph:
-- STATEMENT REGARDING FEDERALLY SPONSORED RESEARCH OR DEVELOPMENT
This invention was made with government support under "Recovery Act - System Level Demonstration of Highly Efficient and Clean, Diesel Powered Class 8 Trucks (Supertruck)," Program Award Number DE-EE0003403 awarded by the Department of Energy (DOE). The government has certain rights in the invention. --

Signed and Sealed this
Second Day of July, 2019

Andrei Iancu
*Director of the United States Patent and Trademark Office*